(12) United States Patent
Dolle et al.

(10) Patent No.: US 9,431,637 B2
(45) Date of Patent: Aug. 30, 2016

(54) METHOD FOR PREPARING A SOLID-STATE BATTERY BY SINTERING UNDER PULSATING CURRENT

(75) Inventors: Michael Dolle, Toulouse (FR); Patrick Rozier, Toulouse (FR); Gaelle Delaizir, Toulouse (FR); Jean-Marie Tarascon, Mennecy (FR); Virginie Viallet, Boves (FR); Mathieu Morcrette, Amiens (FR); Vincent Seznec, Amiens (FR); Renaud Bouchet, Marseilles (FR); Abdelmaula Aboulaich, Marseilles (FR); Laurence Tortet, Marseilles (FR)

(73) Assignee: CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 1046 days.

(21) Appl. No.: 13/578,415

(22) PCT Filed: Feb. 17, 2011

(86) PCT No.: PCT/FR2011/050344
§ 371 (c)(1),
(2), (4) Date: Oct. 25, 2012

(87) PCT Pub. No.: WO2011/101603
PCT Pub. Date: Aug. 25, 2011

(65) Prior Publication Data
US 2013/0189562 A1 Jul. 25, 2013

(30) Foreign Application Priority Data
Feb. 18, 2010 (FR) .................................... 10 51149

(51) Int. Cl.
*H01M 10/0562* (2010.01)
*H01M 4/04* (2006.01)
(Continued)

(52) U.S. Cl.
CPC ........... *H01M 2/0207* (2013.01); *H01M 2/204* (2013.01); *H01M 4/0471* (2013.01); *H01M 4/139* (2013.01); *H01M 10/058* (2013.01);
(Continued)

(58) Field of Classification Search
None
See application file for complete search history.

(56) References Cited

U.S. PATENT DOCUMENTS

| 4,514,473 A | 4/1985 | Atkin et al. |
| 2009/0123847 A1* | 5/2009 | Okada ................. H01M 4/5825 429/319 |

FOREIGN PATENT DOCUMENTS

| CN | 101227016 | * 7/2008 |
| EP | 2086038 | 8/2009 |
| JP | 2000-200621 | * 7/2000 |

OTHER PUBLICATIONS

International Search Report dated May 23, 2011, for PCT/FR2011/50344, May 2011.
(Continued)

*Primary Examiner* — Jonathan Crepeau
(74) *Attorney, Agent, or Firm* — Sofer & Haroun, LLP (57) ABSTRACT

The present invention relates to a method for preparing a completely solid Li-ion battery having a solid state body wherein the battery is assembled in a single step by stacking at least one layer of a powder mix including a positive electrode active material and a solid electrolyte, at least one intermediate layer of a solid electrolyte and at least one layer of a powder mix including a negative electrode active material and a solid electrolyte, and simultaneous sintering of the three layers at a pressure of at least 20 MPa, under pulsating current. The invention also relates to the Li-ion battery obtained by such a method.

26 Claims, 4 Drawing Sheets

(51) Int. Cl.
*H01M 4/58* (2010.01)
*H01M 2/02* (2006.01)
*H01M 4/139* (2010.01)
*H01M 10/0525* (2010.01)
*H01M 10/058* (2010.01)
*H01M 2/20* (2006.01)
*H01M 4/02* (2006.01)

(52) U.S. Cl.
CPC ..... *H01M 10/0525* (2013.01); *H01M 10/0562* (2013.01); *H01M 4/02* (2013.01); *H01M 4/5825* (2013.01); *H01M 2004/021* (2013.01); *H01M 2300/0071* (2013.01); *Y02E 60/122* (2013.01); *Y10T 29/49115* (2015.01)

(56) References Cited

OTHER PUBLICATIONS

Xu et al., Dense nanostructured solid electrolyte with high Li-ion conductivity by spark plasma sintering technique, Materials Research Bulletin 43 (2008) 2334-2341.

Nagata, K., et al., All solid battery with phosphate compounds made through sintering process, Journal of Power Sources 174 (2007) 832-837.

\* cited by examiner

METHOD FOR PREPARING A SOLID-STATE BATTERY BY SINTERING UNDER PULSATING CURRENT

RELATED APPLICATIONS

This application is a National Phase Application of PCT/FR2011/050344, filed on Feb. 17, 2011, which in turn claims the benefit of priority from French Patent Application No. 10 51149 filed on Feb. 18, 2010, the entirety of which are incorporated herein by reference.

BACKGROUND

1. Field of the Invention

The present invention relates to a process for producing an "all-solid-state" Li-ion battery comprising composite ceramic electrodes by pulsed current sintering and to the "all-solid-state" battery obtained by such a process.

This invention is applicable to the manufacture of "all-solid-state" bulk electrochemical generators (as opposed to microbatteries).

2. Description of Related Art

Microbatteries are ultrathin "all-solid-state" batteries each element of which takes the form of a thin solid layer (layered ceramic materials). They generally consist of at least three layers, namely a negative electrode (anode), a positive electrode (cathode) and an electrolyte separating the negative electrode from the positive electrode and providing ion conductivity. Generally, lithium metal is chosen as the negative-electrode material. The materials used in the positive electrode are the same as in conventional lithium-ion batteries. The solid electrolyte is generally a vitreous oxide-based material, sometimes an oxysulfide or an oxynitride for a better ion conductivity.

Lithium-ion (Li-ion) batteries at the present time are used in most portable electronics on the market. Li-ion batteries have a number of advantages, especially:

they have no memory effect, in contrast to nickel-based accumulators;
they have a low self-discharge;
they do not require maintenance; and
they have a high energy density per unit mass. These batteries are therefore widely used in the field of mobile systems.

"All-solid-state" Li-ion batteries, i.e. in which the two electrodes and the electrolyte are made of solid materials, are of great interest because of their potentially better properties relative to those of conventional batteries based on liquid or gel electrolytes. They especially provide a fundamental solution to the safety and environmental problems of conventional Li-ion batteries. Rechargeable batteries without a liquid electrolyte have considerable advantages including, for example, thermal stability, the absence of leakage and pollution, a high resistance to shocks and vibrations, a large window of electrochemical stability and an environmental impact when reprocessing the cells.

The various layers of microgenerators are mainly produced by physical vapor phase deposition methods such as cathode sputtering and thermal evaporation. The various layer are deposited in succession, thus making it possible to ensure the materials bond together and to create well defined interfaces. The development of bulk "all-solid-state" batteries frequently consists of a composite/electrolyte/Li-M metal alloy electrode multilayer in which the cohesion between the layers is most often ensured by simple cold pressing. Kitaura H. et al. (*Journal of Power Sources*, 2009, 189, 145-148) for example describe producing an "all-solid-state" Li—In/$Li_4Ti_5O_{12}$ battery in which the electrolyte is produced by crystallizing the ceramic, the electrode and the electrolyte then being assembled by cold pressing. Sakuda A. et al. (*Journal of Power Sources*, 2009, 189, 527-530) moreover describe the production of a lithium secondary battery comprising an oxide-coated ($Li_2SiO_3$ and $SiO_2$) $LiCoO_2$ electrode and a ceramic electrolyte ($Li_2S$—$P_2S_5$). In the process described in this article, the ceramic electrolyte layer is produced independently by heat treatment (210° C. for 4 hours). The positive electrode is produced using a mixture of $LiCoO_2$ powder and ground ceramic electrolyte. The negative electrode is an indium foil. However, in this second case, forming the battery requires a number of steps and restrictive conditions since it is formed by cold compressing a positive electrode layer and the ceramic electrolyte and then applying the indium foil in an argon atmosphere in a glove box. In addition, this technique of forming the battery by cold pressing does not ensure high-quality interfaces between the layers, thereby imposing strong kinetic limitations meaning that thin electrodes must be used, these electrodes, because they are thin, containing little active material (less than 7 mg for an area of 0.79 $cm^2$, i.e. less than 9 $mg/cm^2$).

It has also been proposed before to produce thin (electrode and/or solid electrolyte) films by pulsed current sintering. Thus Xu X. et al. (Material Research Bulletin, 2008, 43, 2334-2341) describe producing a solid electrolyte with a NASICON-type structure (structure of the compound $Na_3Zr_2Si_2PO_{12}$) by pulsed current sintering of an $Li_{1.4}Al_{0.4}Ti_{1.6}(PO_4)_3$ (LATP) nanopowder.

Nagata K. et al. (*Journal of Power Sources*, 2007, 174, 832-837) describe producing "all-solid-state" ceramic batteries by sintering. It is mentioned in this article that production of "all-solid-state" batteries comprising a solid crystalline-oxide electrolyte is difficult in that the heat treatment causes a reaction in the solid state between the electrolyte layer and the active electrode materials in contact with the electrolyte layer, thereby causing electrochemical deactivation of the electrolyte/electrode interface. The authors used a phosphate, such as $Li_{1.3}Al_{0.3}Ti_{1.7}(PO_4)_3$ (LATP), for the solid electrolyte and a phosphate, such as $LiCoPO_4$ et $Li_3Fe_2(PO_4)_3$, for the active electrode material; it is possible to carry out co-sintering without a chemical reaction taking place, the interface then remaining active. In this case, the sintering is carried out at 800° C. for 5 hours in air. The electrode material used according to the process described in this article does not however contain an electron-conductivity providing agent other than the electrode material, meaning that very small electrode thicknesses (smaller than 10 μm) must be worked with to obtain batteries having advantageous electrochemical properties, but the capacities of which are comparable to those of microbatteries.

Finally, document EP 2 086 038 describes an all-solid-state battery comprising a positive electrode, a negative electrode and, placed between the two is electrodes, a solid electrolyte. Each electrode comprises an active material (for example $LiMn_2O_4$ for the positive electrode or $SiO_2$ for the negative electrode), an ion conductive agent (electrolyte) and an electron conductive agent, such as carbon or graphite. The electrolyte content does not exceed 30 wt % relative to the weight of the electrode. Specifically, this document teaches that if the electrolyte content and the content of electron conductive agent are too high, the amount of active material in each electrode will be reduced as a result and thus the capacity of the battery will be decreased. In addition, the electrode layers obtained are thin, about 12 to 15 μm in thickness. However, a small thickness also reduces the amount of energy that may be stored in a battery. This document also describes a process that allows such a battery to be obtained. This process has a number of steps consisting in manufacturing a positive electrode strip, a negative electrode strip and an intermediate electrolyte strip, separately. To do this, an acrylic (polymer)-based binder is used for each strip, which binder is then subsequently removed by burning. Next, the electrode strips are pressed against the electrolyte strip and the assembly is sintered.

There is therefore at the current time no method that allows an all-solid-state Li-ion battery with thick ceramic electrodes (for example about 30 μm or more in thickness) having very good electrochemical properties, especially associated with the presence of an electron-conductivity providing agent in the composite electrodes, to be obtained in a single step, which method does not adversely affect the density of these electrodes and the adhesion at the electrode/electrolyte interfaces within these composite electrodes.

OBJECTS AND SUMMARY

The inventors therefore set themselves the goal of providing a process allowing such batteries to be obtained.

One subject of the present invention is a process for producing an all-solid-state Li-ion battery with a monolithic body comprising at least one negative-electrode composite layer and at least one positive-electrode composite layer, said layers being separated from one another by at least one intermediate solid-electrolyte layer, said process comprising the following steps:
  preparing a pulverulent mixture (MP1) comprising at least one powder of an active negative-electrode material, at least one powder of a solid electrolyte, to and at least one electron-conductivity providing agent; and
  preparing a pulverulent mixture (MP2) comprising at least one powder of an active lithium-based positive-electrode material, and at least one electron-conductivity providing agent,
and being characterized in that:
  the battery is formed in a single step by superposing at least one layer of mixture MP1 and at least one layer of mixture MP2, said layers being separated from one another by at least one intermediate layer of a solid electrolyte in the form of a pulverulent, and simultaneously sintering these sets of three layers, at a pressure of at least 20 MPa, using a pulsed current;
  the particle size of the solid electrolyte in pulverulent form is 5 μm or less;
  the solid-electrolyte content in each of the mixtures MP1 and MP2 independently varies from 10 to 80 wt %;
  the content of the electron-conductivity providing agent in each of the mixtures MP1 and MP2 independently varies from 2 to 25 wt %; and
  the active electrode material content in each of the mixtures MP1 and MP2 independently varies from 20 to 85 wt %.

According to this process, the presence of a solid electrolyte in each of the three layers forming the battery ensures a homogenous chemical composition, which means that the various constituents densify simultaneously at the same temperature and that the Li$^+$-conducting lattice is continuous from one composite electrode to the other and especially at the electrode/electrolyte interfaces. In addition, since the three layers of the multilayer each comprise such an electrolyte, a block of concentration gradients is created allowing stresses, generated by associating materials having different thermal expansion coefficients, to be absorbed.

Relative to prior-art processes, the process according to the invention has the following advantages:
  it allows "all-solid-state" Li-ion batteries with ceramic electrodes to be produced in a single step;
  it is rapid and simple to implement: by virtue of simultaneous sintering of the three layers at a single temperature, in contrast to multi-step processes using different temperatures often leading to parasitic chemical reactions that commonly limit the number of layers that can be simultaneously sintered to two; in addition, no prior preparation (green sheets, etc.), except mixing of the powders of the composite electrodes, is required;
  no parasitic reaction takes place between the constituents of the various layers of the battery, in particular between the electron-conductivity providing agent and the other constituents of the electrodes, while a good contact at the electrodes/electrolyte interfaces is guaranteed;
  it makes it possible to produce self-supporting batteries that do not need a substrate;
  it results in batteries having composite electrodes with good electron conductivity properties and thicknesses much larger than those of "all-solid-state" Li-ion batteries in which the electrode material contains no electron-conductivity providing agent;
  it makes it possible to produce batteries in which the electrode layers are thicker than in the "all-solid-state" Li-ion batteries that have been technically possible up to now, especially batteries in which each of the electrode layers may be more than 30 μm in thickness, and therefore batteries that have a much higher storage capacity; and
  it makes it possible to develop batteries that are more thermally stable than conventional Li-ion batteries, both in the charged and discharged state. These batteries can be operated at higher temperatures (>130° C. and up to 350° C.) than conventional batteries.

The particle size of the solid-electrolyte powders that can be used in the mixtures MP1 and MP2 and in the intermediate electrolyte layer is preferably smaller than the particle size of the other pulverulent components present in the mixtures MP1 and MP2. According to a particularly preferred embodiment of the invention, the particle size of the solid-electrolyte powders is 1 μm or less. In this case, it preferably varies from 0.1 to 1 μm.

The average particle size of the mixtures MP1 and MP2 is preferably larger than that of the solid-electrolyte powders. Preferably, the average particle size of mixtures MP1 and MP2 independently varies from 1 to 10 μm, and even more preferably from 1 to 3 μm.

According to a preferred embodiment of the invention, the particle size of the mixture MP1 is substantially identical to the particle size of the mixture MP2. In the present invention, the expression "substantially identical particle size" is understood to mean that the maximum difference in particle size between the mixtures MP1 and MP2 is ±2 μm.

The active negative-electrode material may be chosen from lithium phosphates, titanium/lithium oxides such as $Li_4Ti_5O_{12}$, niobium phosphates such as $PNb_9O_{25}$, silicon and graphite.

Among the lithium phosphates that can be used for the active negative-electrode material, $Li_3V_2(PO_4)_3$, $LiTi_2(PO_4)_3$, and their mixtures are most particularly preferred.

The aforementioned compounds recommended for the active negative-electrode material (such as $Li_3V_2(PO_4)_3$, LiTi$_2$(PO$_4$)$^3$, PNb$_9$O$_{25}$, Li$_4$Ti$_3$O$_{12}$) may be coated with a protective layer, such as AlPO$_4$, Li$_2$SiO$_3$, ZrO$_2$, FePO$_4$.

The solid electrolytes that can be used according to the present invention are preferably chosen from lithium phosphates having the general formula Li$_{1+x}$Al$_x$M$_{2-x}$(PO$_4$)$_3$ where M=Ge, Ti, Zr, Hf and 0<x<1. Among such lithium phosphates, the compounds Li$_{1.5}$Al$_{0.5}$Ge$_{1.5}$(PO$_4$)$_3$ and Li$_{1.3}$Al$_{0.3}$Ti$_{1.7}$(PO$_4$)$_3$ are particularly preferred.

According to a first embodiment of the present invention, the three layers forming the battery contain the same electrolyte.

In the present invention, the expression "same electrolyte" is understood to mean that the chemical nature and the particle size of the electrolyte are identical in mixtures MP1 and MP2 and in the intermediate electrolyte layer.

According to a second embodiment of the present invention, the solid electrolyte present in the mixture MP1 is different to the solid electrolyte present in the mixture MP2.

In the present invention, the expression "the electrolyte is different" encompasses both a different chemical nature and a different physical nature, such as a different particle size.

When the solid electrolyte present in the mixture MP1 is different to the solid electrolyte present in the mixture MP2, the layer of mixture MP1 contains at least one solid electrolyte E1, the layer of mixture MP2 contains at least one solid electrolyte E2 that is different from E1, and the electrolyte layer separating the layers of the mixtures MP1 and MP2 consists of at least one layer of electrolyte E1 making contact with the layer of mixture MP1, and at least one layer of electrolyte E2 making contact with the layer of mixture MP2.

According to a preferred embodiment, the solid-electrolyte content in each of the mixtures preferably varies from 10 to 80 wt %. This content may vary between the mixtures MP1 and MP2 and depends on the particle size and the electron and ion conduction properties of the active material. According to an even more preferable embodiment, the solid-electrolyte content in each of the mixtures MP1 and MP2 independently varies from 30 to 80 wt %, and in particular from 35 to 80 wt %, and even more preferably from 35 to 80 wt % (exclusive).

The active positive-electrode material is preferably chosen from lithium phosphates and lithium oxides. Among lithium phosphates that can be used for the active positive-electrode material, LiFePO$_4$, LiCoPO$_4$, LiNiPO$_4$, LiMnPO$_4$, Li$_3$V$_2$(PO$_4$)$_3$, Li$_3$Fe$_2$(PO$_4$)$_3$ are most particularly preferred, and among lithium oxides LiXO$_2$ (where X=Co, Ni, Mn, or one of their combinations) is preferred, and their mixtures.

These various compounds recommended for the active positive-electrode material may be coated with a protective layer such as: AlPO$_4$, Li$_2$SiO$_3$, ZrO$_2$, FePO$_4$.

According to the invention, the content of active electrode material in each of the mixtures MP1 and MP2 independently varies from 20 to 85 wt %.

According to a preferred embodiment of the invention, the active negative-electrode material, the one or more solid electrolytes, and the active positive-electrode material are chosen from lithium phosphates.

Preferably, in the process for producing the all-solid-state Li-ion battery, the active positive-electrode material will be different to the active negative-electrode material.

The electron-conductivity providing agent may be chosen from carbon-based materials (powders, fibers, nanotubes, etc.), and from metals such as Ni, Cu, Al (these metals are chosen depending on the operating potential: Cu is for example suitable for negative electrodes and Al is for example suitable for positive electrodes) metal nitrides, such as TiN for example.

According to a preferred embodiment of the invention, the electron-conductivity providing agent is a carbon-based material in the form of particles with nanoscale particle size According to the invention, the content of electron-conductivity providing agent preferably varies from 2 to 25 wt %. This content may vary between the mixtures MP1 and MP2 and depends on the particle size and the electron conductivity properties of the active material.

The sintering is preferably carried out under a primary or secondary vacuum in an argon or nitrogen atmosphere.

The pressure applied to the layers during the sintering may vary. According to a preferred embodiment of the invention, the sintering is carried out at a pressure from 5 to 200 MPa, and even more preferably at a pressure of about 100 MPa.

The maximum sintering temperature may vary from 500 to 1000° C.

The duration of the sintering varies depending on the temperature. This duration generally lies between about 1 and 60 minutes.

According to a particularly preferred embodiment of the invention, the sintering is carried out under a secondary vacuum at a pressure of about 100 MPa, at a maximum temperature lying between 600 and 700° C., maintained for a time of 2 to 4 minutes. The total duration of the heat treatment is, in this case, less than 15 minutes.

The sintering temperature may be reached via progressive temperature plateaus, by applying pulsed currents over a number of periods.

The amplitude of the pulsed current may vary from 10 to 8000 A. The length of each current pulse is of the order of a few milliseconds. This length preferably varies from 1 to 5 ms.

According to an improvement in the process according to the invention, during the step of forming the battery, at least one current collector is positioned on the external face of the layer of mixture MP1 and/or on the external face of the layer of mixture MP2, so as to be simultaneously sintered with the layer of mixture the electrolyte layer and layer of mixture MP2. The expression "external face" of the layer of mixture MP1 and/or MP2, is understood to mean the face of the layer of mixture MP1 and/or MP2 that does not make contact with the intermediate solid electrolyte layer.

The current collector generally takes the form of a powder, a web or of one or more foils.

The material of the current collector is chosen from: copper, nickel, stainless steel, aluminum, carbon, titanium, silver, gold, platinum, or one of their alloys.

They are chosen depending on the operating potential of the active material of the positive and negative electrodes. They must not oxidize or reduce when brought into contact with the electrode material. Copper will thus be preferred for low-potential materials whereas aluminum will be preferred for high-potential materials.

Generally, a first current collector is positioned on the external face of the layer of mixture MP1 and a second current collector is positioned on the external face of the layer of mixture MP2, so as to simultaneously sinter at least five layers: first collector/MP1 layer/solid-electrolyte layer/MP2 layer/second collector.

The invention also relates to the all-solid-state Li-ion battery obtained by implementing the production process according to the invention and such as described above, said battery comprising a monolithic body formed by at least 3 superposed layers, as follows:

at least one layer of a negative-electrode composite comprising at least one active negative-electrode material, at least one solid electrolyte, and at least one electron-conductivity providing agent;

at least one layer of a positive-electrode composite comprising at least one active lithium-based positive-electrode material, at least one solid electrode, and at least one electron-conductivity providing agent;

at least one intermediate solid-electrolyte layer separating said composite negative- and positive-electrode layers from one another;

the solid-electrolyte content in each of the composite electrode layers independently varies from 10 to 80 wt %;

the content of the electron-conductivity providing agent in each of the composite electrode layers independently varies from 2 to 25 wt %; and the active electrode material content in each of the composite electrode layers independently varies from 20 to 85 wt %, said battery being characterized in that the thickness of each of the electrode layers varies, independently from one another, from 30 to 1400 μm.

In particular, the solid-electrolyte content in each of the composite electrode layers independently varies from 30 to 80 wt %, preferably from 35 to 80 wt % and even more preferably from 35 to 80 wt % (exclusive).

According to the invention, the thickness of each of the electrode layers may vary, independently from one another, from about 30 to 800 μm, preferably from 50 to 800 μm and even more preferably from about 50 to 500 μm.

The thickness of the intermediate electrolyte layer preferably varies from about 10 to 500 μm, and even more preferably from about 10 to 60 μm.

According to an improvement of the invention, said monolithic body also comprises at least one current collector superposed on the composite negative-electrode layer and/or on the composite positive-electrode layer, on their external face.

Preferably said current-collector layer is chosen from: copper, nickel, stainless steel, aluminum, carbon, titanium, silver, gold, platinum or one of their alloys.

The present invention also relates to a battery stack (multi-cell pack), characterized in that it comprises at least two batteries such as described above, connected by a current collector belonging to one or other of said batteries, said current collector forming a physical barrier to the passage of ions. According to the invention, the expression "physical barrier to the passage of ions" is understood to mean that the collector takes the form of a sintered powder or a foil but not that of a web, which does not form a physical barrier to ions.

Thus, the current collector connects two batteries at one of their electrodes, whether this electrode is a positive or negative electrode. This is why the collector is preferably simultaneously compatible with both of the electrodes that it connects. Furthermore, the current collector may connect two negative or two positive electrodes. In this case, the batteries are said to be connected back to back. The current collector may also connect a negative electrode and a positive electrode. In this case, the batteries are said to be connected in series (bipolar architecture).

in addition, it is possible to superpose two current collectors (one belonging to each of the batteries) at the joint between the two batteries (with an alloy optionally being formed between the 2 collectors, providing this alloy remains compatible with the potentials of the electrodes concerned).

DETAILED DESCRIPTION

The present invention will be better understood and other of its objects, details, features and advantages will become more clearly apparent on reading the following description of exemplary embodiments.

EXAMPLES

The various inorganic materials that were not commercially available, used in the examples, were synthesized beforehand using methods known in the literature:

lithium iron phosphate ($LiFePO_4$): Delacourt, C. et al., *Solid State Ionics*, 2004, 173, 113-118;

lithium aluminum germanium phosphate ($Li_{1.5}Al_{0.5}Ge_{1.5}(PO_4)_3$): M. Cretin, P. Fabry, *J Eur. Ceram. Soc.*, 1999, 19, 2931-2940; and lithium vanadium phosphate ($Li_3V_2(PO_4)_3$): S. Patoux et al, *J. Power Sources*, 2003, 119421, 278-284.

Example 1

Production of an "all-Solid-State" Li-Ion Battery According to the Process of the Invention In this example, a 15 mm-diameter battery was produced in which the positive/negative electrode mass ratio was 1.2 for electrode compositions containing 25 wt % active electrode material, 60 wt % electrolyte and 15 wt % electron-conductivity producing agent.

This battery consisted of:

a positive electrode composed of 0.0215 g of $LiFePO_4$ (LFP) having an average particle size of 15-20 μm, of 0.0515 g of $Li_{1.5}Al_{0.5}Ge_{1.5}(PO_4)_3$ (LAG) having an average particle size of 5-10 μm and of 0.0219 g of carbon black, sold under the trade name Super P® by Timcal, having an average particle size of 50-100 nm. The mixture of these ingredients was manually ground in an agate mortar for 20 minutes;

a negative electrode composed of 0.0178 g of $Li_3V_2(PO_4)_3$ (LVP) having an average particle size of 30-40 μm of 0.0426 g of LAG having an average particle size of 5-10 μm and of 0.0106 g of Super P® carbon, sold by Timcal, having an average particle size of 50-100 nm.

The mixture of these ingredients was manually ground in an agate mortar for 20 minutes; and of a solid electrolyte composed of 0.2412 g of $Li_{1.5}Al_{0.5}Ge_{1.5}(PO_4)_3$ having a particle size ranging from 0.4 to 5 μm.

The various mixtures making up the positive electrode, the electrolyte and the negative electrode were then placed in succession in a 15 mm-diameter graphite die (grade 2333, Carbone Lorraine) the interior of which was protected with a flexible graphite film sold under the trade name Papyex® by Carbone Lorraine. The die was then closed by symmetrical pistons also made of grade 2333 graphite and introduced into the chamber of an SPS machine sold by Sumitomo Inc. under the trade name Dr Sinter 2080®, and the chamber was then pumped to a secondary vacuum. The battery was then formed by applying two ramps, namely a pressure ramp and a temperature ramp. A pressure of 100 MPa was achieved in three minutes and held for the rest of the synthesis (7 minutes). A temperature of 650° C. was achieved in 2 steps: a ramp at 100° C.min$^{-1}$ for 5 minutes, then a ramp of 50° C.min.$^{-1}$ for 3 minutes. This temperature was then held for 2 minutes. These temperature ramps were obtained by applying pulsed DC currents defined over 14 periods of 3.2 ins, 12 periods of pulses and 2 periods without pulses. The die was then cooled in the chamber of the SPS. The battery thus obtained was then buffed with sandpaper so as to remove the residual Papyex® film.

A monolithic 15 mm-diameter Li-ion battery having a total thickness of 870 μm was thus obtained, said battery consisting of a layer of a 220 μm-thick positive-electrode composite, a 430 μm-thick intermediate solid-electrolyte layer and a 220 μm-thick layer of a negative-electrode material.

In this battery, the positive/negative electrode mass ratio was 1.2 for electrode compositions containing 25 wt % active electrode material, 60 wt % $Li_{1.5}Al_{0.5}Ge_{1.5}(PO_4)_3$ electrolyte and 15 wt % Super P® carbon.

Figure 1:
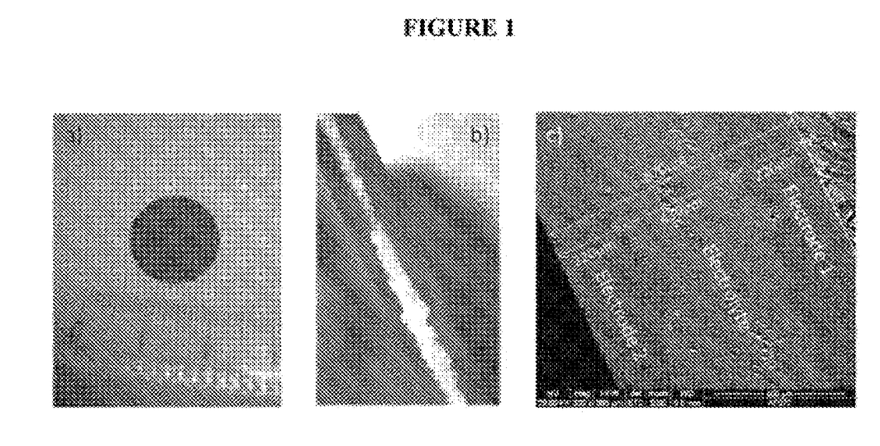
FIGS. 1a-1c shows a battery of example 1 according to one embodiment.

Appended FIG. 1 shows a) the all-solid-state battery thus obtained, b) image of the cross section of the battery allowing the three superposed layers to be seen, and c) a backscattered-electron scanning electron microscope (SEM) micrograph of this same cross section.

Example 2

Production of an "all-Solid-State" Li-Ion Battery According to the Process of the Invention In this example, an 8 mm-diameter battery was produced in which the positive/negative electrode mass ratio was 0.72 for electrode compositions containing 25 wt % active electrode material, 60 wt % electrolyte and 15 wt % electron-conductivity producing agent.

This battery consisted of:
a positive electrode composed of 0.0115 g of LFP having an average particle size of 15-20 μm, of 0.0276 g of LAG having an average particle size of 5-10 μm and of 0.0069 g of carbon black, sold under the trade name Super P® by Timcal, having an average particle size of 50-100 nm. The mixture of these ingredients was manually ground in an agate mortar for 20 minutes;
a negative electrode composed of 0.016 g of LVP having an average particle size of 30-40 μm, of 0.0384 g of LAG having an average particle size of 5-10 μm and of 0.0096 g of Super P® carbon, sold by Timcal, having an average particle size of 50-100 nm. The mixture of these ingredients was manually ground in an agate mortar for 20 minutes; and of a solid electrolyte composed of 0.078 g of LAG having an average particle size ranging from 5-10 μm.

The various mixtures making up the positive electrode, the electrolyte and the negative electrode were then placed in succession in an 8 mm-diameter graphite die (grade 2333, Carbone Lorraine) the interior of which was protected with a Papyex® film. The die was then closed by symmetrical pistons also made of grade 2333 graphite and introduced into the chamber of an SPS machine used above in example 1, and the chamber was then pumped to a secondary vacuum. The battery was then formed under the conditions described above in example 1.

An 8 mm-diameter "all-solid-state" battery having a total thickness of 1600 μm was obtained, said battery consisting of a layer of a 400 μm-thick positive-electrode composite, a 500 μm-thick intermediate solid-electrolyte layer and a 714 μm-thick layer of a negative-electrode material.

This battery then underwent electrochemical testing. In order to carry out this electrochemical testing, a layer of a few hundred nanometers of gold was deposited on the two faces of the battery by cathode sputtering. The battery was then placed in a Swagelok® cell and assembled in an inert atmosphere glove box. The battery was then tested in galvanostatic mode using a Solartron 1470® test system. In order to carry out temperature testing, the cell was placed in a climatic chamber, which operated in a temperature range between 25° C. and 150° C. The regimes are expressed in C/n, corresponding to complete charge or discharge of the battery in n hours.

Figure 2:
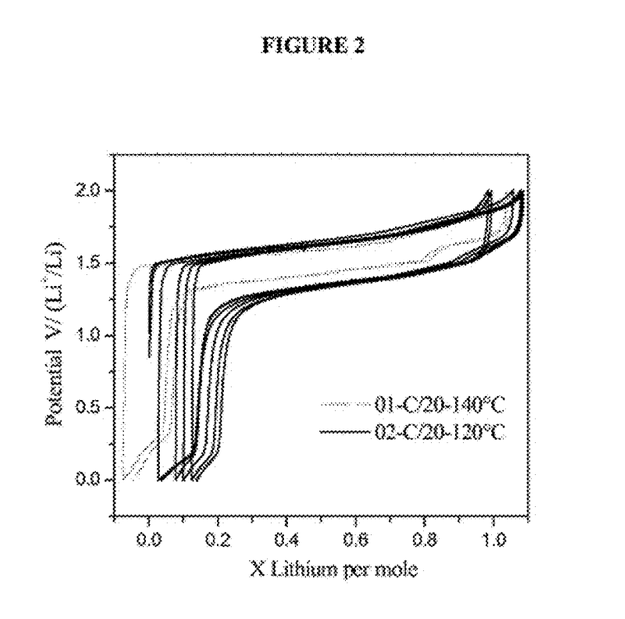
FIG. 2 is an image of cycling curves from Example 2 according to one embodiment.

Appended FIG. 2 shows the cycling curves obtained at 140° C. (2 cycles, light gray curves) and 120° C. (6 cycles, black curves) under the same cycling regime of C/20, i.e. a complete charge and discharge in 20 hours. In this figure, the potential V (Li$^+$/Li) is a function of the amount of inserted lithium per mole of active material in the cathode.

These curves show that all of the available capacity is recovered and ii/the good cyclability of this battery.

Example 3

Production of an "all-Solid-State" Li-Ion Battery According to the Process of the Invention In this example, an 8 mm-diameter battery was produced in which the is positive/negative electrode mass ratio was 1.00 for electrode compositions containing 25 wt % active electrode material, 60 wt % electrolyte and 15 wt % electron-conductivity producing agent.

This battery consisted of:
a positive electrode and a negative electrode both composed of 0.0081 g of LVP having an average particle size of 30-40 μm, of 0.0195 g of LAG having an average particle size of 5-10 μm and of 0.0049 g of carbon black, sold under the trade name Super P® by Timcal, having an average particle size of 50-100 nm. The mixture of these ingredients was manually ground in an agate mortar for 20 minutes; and
of a solid electrolyte composed of 0.78 g of LAG having an average particle size ranging from 5-10 μm.

The various mixtures making up the positive electrode, the electrolyte and the negative electrode were then placed in succession in an 8 mm-diameter graphite die (grade 2333, Carbone Lorraine) the interior of which was protected with a flexible graphite film sold under the trade name Papyex® by Carbone Lorraine. The die was then closed by symmetrical pistons also made of grade 2333 graphite and introduced into the chamber of an SPS machine sold by Sumitomo Inc, under the trade name Dr Sinter 2080®, and the chamber was then pumped to a secondary vacuum. The battery was then formed by applying two ramps, namely a pressure ramp and a temperature ramp. A pressure of 100 MPa was achieved in three minutes and held for the rest of the synthesis (7 minutes). A temperature of 680° C. was achieved in 2 steps: a ramp at 100° C.min$^{-1}$ for 6 minutes, then a ramp of 40° C.min$^{-1}$ for 2 minutes. This temperature was then held for 2 minutes. These temperature ramps were obtained by applying pulsed DC currents defined over 14 periods of 3.2 ms, 12 periods of pulses and 2 periods without pulses. The die was then cooled in the chamber of the SPS. The battery thus obtained was then buffed with sandpaper so as to remove the residual Papyex® film.

An 8 mm-diameter "all-solid-state" battery having a total thickness of 1000 μm was obtained, said battery consisting of a layer of a 250 μm-thick positive-electrode composite, a 500 μm-thick intermediate solid-electrolyte layer and a 250 μm-thick layer of a negative-electrode material.

In this battery, the positive/negative electrode mass ratio was 1 for electrode compositions containing 25 wt % $Li_3V_2(PO_4)_3$ active electrode material, 65 wt % $Li_{1.5}Al_{0.5}Ge_{1.5}(PO_4)_3$ electrolyte and 15 wt % Super P® carbon.

This battery was then subjected to the electrochemical testing described above in example 2.

Figure 3:
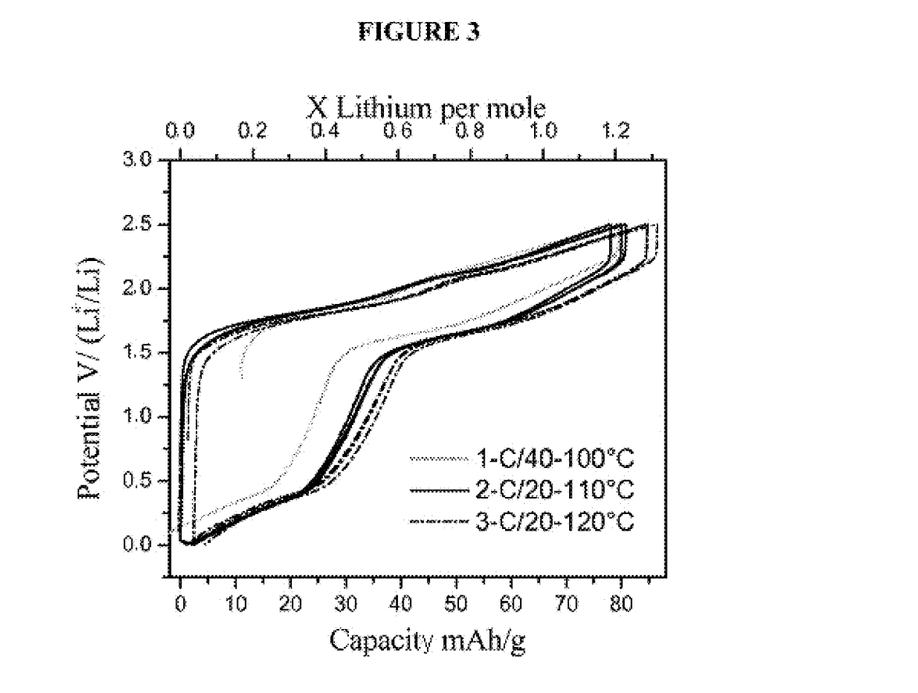
FIG. 3 is an image of cycling curves from Example 3 according to one embodiment.

Appended FIG. 3 shows the cycling curves obtained at 100° C. (1 cycle for C/40: light gray curve), at 110° C. (3 cycles for C/20: black curve) and finally at 120° C. (3 cycles for C/20: dash-dot curve). In this figure, the potential V (Li$^+$/Li) is a function of the capacity (in mAh/g) and the amount of lithium inserted per mole of active material.

These curves show that the cyclability of this battery is very good and a temperature increase improves the performance obtained.

Figure 4:
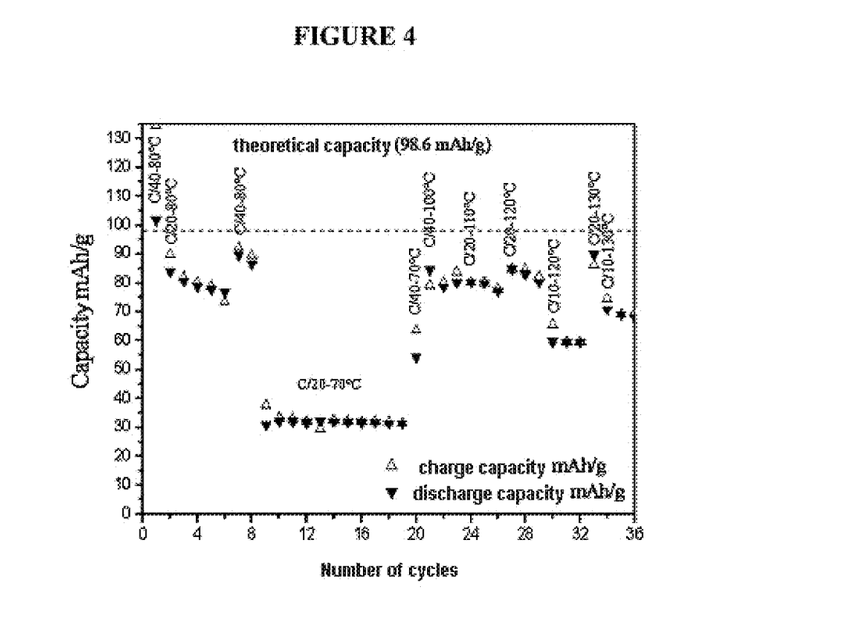
FIG. 4 is a specific capacity chart of the battery of Example 3 according to one embodiment.

Appended FIG. 4 shows the variation in the specific capacity of the battery for various regimes and various temperatures. In this figure, the capacity of the battery (in mAh/g) is a function of the number of cycles, the hollow triangles correspond to the charge capacity (mAh/g) and the solid triangles to the discharge capacity (mAh/g).

Example 4

Production of an "all-Solid-State" Li-Ion Battery According to the Process of the Invention In this example, an 8 mm-diameter battery was produced in which the positive/negative electrode mass ratio was 0.5 for electrode compositions containing 25 wt % active electrode material, 60 wt % electrolyte and 15 wt % electron-conductivity producing agent.

This battery consisted of:
  a positive electrode composed of 0.0125 g of LVP having an average particle size of 30-40 μm, of 0.03 g of LAG having an average particle size of 5-10 μm and of 0.0075 g of carbon black, sold under the trade name Super P® by Timcal, having an average particle size of 50-100 nm. The mixture of these ingredients was manually ground in an agate mortar for 20 minutes;
  a negative electrode composed of 0.025 g of LVP having an average particle size of 30-40 μm, of 0.06 g of LAG having an average particle size of 5-10 μm and of 0.015 g of carbon black sold under the trade name Super P® by Timcal, having an average particle size of 50-100 nm. The mixture of these ingredients was manually ground in an agate mortar for 20 minutes; and
  of a solid electrolyte composed of 0.074 g of LAG having an average particle size ranging from 5-10 μm.

The various mixtures making up the positive electrode, the electrolyte and is the negative electrode were then placed in succession in an 8 mm-diameter graphite die (grade 2333, Carbone Lorraine) the interior of which was protected with a flexible graphite film sold under the trade name Papyex® by Carbone Lorraine. The die was then closed by symmetrical pistons also made of grade 2333 graphite and introduced into the chamber of an SPS machine sold by Sumitomo Inc. under the trade name Dr Sinter 2080®, and the chamber was then pumped to a secondary vacuum. The battery was then formed by applying two ramps, namely a pressure ramp and a temperature ramp. A pressure of 100 MPa was achieved in three minutes and held, for the rest of the synthesis (7 minutes). A temperature of 680° C. was achieved in 2 steps: a ramp at 100° C.min$^{-1}$ for 6 minutes, then a ramp of 40° C.min$^{-1}$ for 2 minutes. This temperature was then held for 2 minutes. These temperature ramps were obtained by applying pulsed DC currents defined over 14 periods of 12 ms, 12 periods of pulses and 2 periods without pulses. The die was then cooled in the chamber of the SPS. The battery thus obtained was then buffed with sandpaper so as to remove the residual Papyex® film.

An 8 mm-diameter "all-solid-state" battery having a total thickness of 1630 μm was obtained, said battery consisting of a layer of a 380 μm-thick positive-electrode composite, a 500 μm-thick intermediate solid-electrolyte layer and a 750 μm-thick layer of a negative-electrode material.

In this battery, the positive/negative electrode mass ratio was 0.5 for electrode compositions containing 25 wt % $Li_3V_2(PO_4)_3$ active electrode material, 65 wt % $Li_{1.5}Al_{0.5}Ge_{1.5}(PO_4)_3$ electrolyte and 15 wt % Super P® carbon.

This battery was then subjected to the electrochemical testing described above in example 2.

Figure 5:
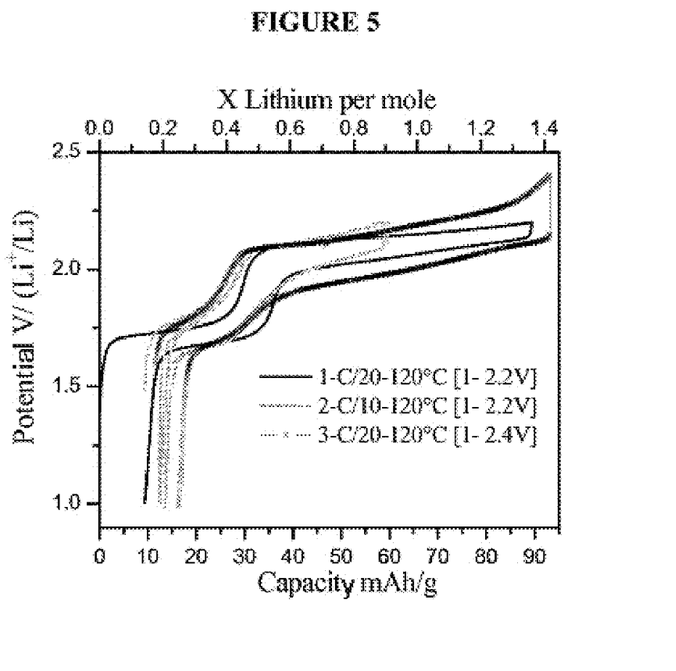
FIG. 5 is an image of electrochemical curves from Example 4 according to one embodiment.

Appended FIG. 5 shows electrochemical curves for the battery thus obtained in various regimes and various potential windows (1-2.2 V and 1-2.4 V. In this figure, the potential V (Li$^+$/Li) is a function of the capacity (in mAh/g) and of the amount of lithium inserted per mole of active material in the cathode: the black curve corresponds to cycling carried out at 120° C. (1 cycle for C/20 between 1 and 2.2 V); the light gray curve corresponds to cycling carried out at 120° C. (3 cycles for C/10 between 1 and 2.2 V); and finally, the black crossed lines correspond to cycling carried out at 120° C. (1 cycle for C/20 between 1 and 2.4 V).

Example 5

Production of an "all-Solid-State" Li-Ion Battery According to the Process of the Invention In this example, an 8 mm-diameter battery was produced in which the positive/negative electrode mass ratio was 1.0 for electrode compositions containing 42.5 wt % active electrode material, 42.5 wt % electrolyte and 15 wt % electron-conductivity producing agent.

This battery consisted of:
  a positive electrode and a negative electrode composed of 0.021 g of LVP having an average particle size of 30-40 μm, of 0.021 g of LAG having an average particle size of 5-10 μm and of 0.0075 g of carbon black, sold under the trade name Super P® by Timcal, having an average particle size of 50-100 nm. The mixture of these ingredients was manually ground in an agate mortar for 20 minutes; and of a solid electrolyte composed of 0.06 g of LAG having an average particle size ranging from 5-10 μm.

The various mixtures making up the positive electrode, the electrolyte and the negative electrode were then placed in succession in a 8 mm-diameter graphite die (grade 2333, Carbone Lorraine) the interior of which was protected with a flexible graphite film sold under the trade name Papyex® by Carbone Lorraine. The die was then closed by symmetrical pistons also made of grade 2333 graphite and introduced into the chamber of an SPS machine sold by Sumitomo Inc. under the trade name Dr Sinter 2080®, and the chamber was then pumped to a secondary vacuum. The battery was then formed by applying two ramps, namely a pressure ramp and a temperature ramp. A pressure of 100 MPa was achieved in three minutes and held for the rest of the synthesis (7 minutes). A temperature of 680° C. was achieved in 2 steps: a ramp at 100° C.min$^{-1}$ for 6 minutes, then a ramp of 40° C.min$^{-1}$ for 2 minutes. This temperature was then held for 2 minutes. These temperature ramps were obtained by applying pulsed DC currents defined over 14 periods of 3.2 ms, 12 periods of pulses and 2 periods without pulses. The die was then cooled in the chamber of the SPS. The battery thus obtained was then buffed with sandpaper so as to remove the residual Papyex® film.

An 8 mm-diameter "all-solid-state" battery having a total thickness of 1240 μm was obtained, said battery consisting of a layer of a 415 μm-thick positive-electrode composite, a 410 μm-thick intermediate solid-electrolyte layer and a 415 μm-thick layer of a negative-electrode material.

In this battery, the positive/negative electrode mass ratio was 1 for electrode compositions containing 42.5 wt % $Li_3V_2(PO_4)_3$ active electrode material, 42.5 wt % $Li_{1.5}Al_{0.5}Ge_{1.5}(PO_4)_3$ electrolyte and 15 wt % Super P® carbon.

This battery was then subjected to the electrochemical testing described above in example 2.

Figure 6:
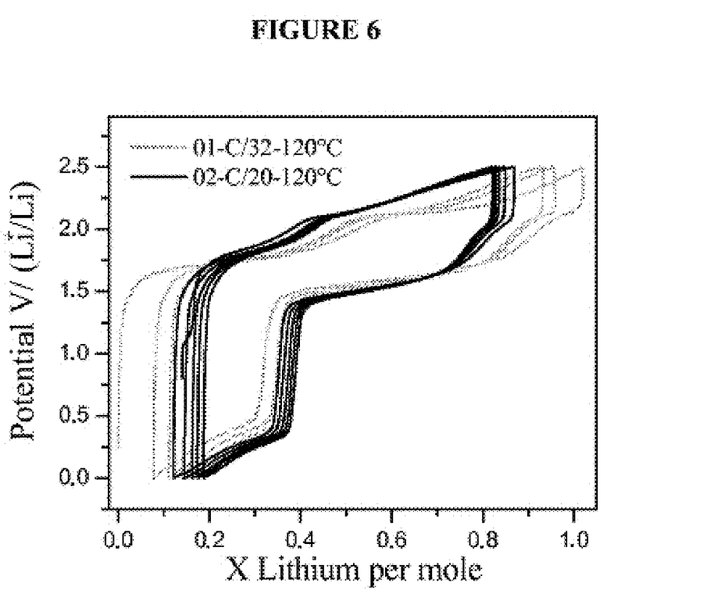
FIG. 6 is an image of electrochemical curves from Example 5 according to one embodiment.

Appended FIG. 6 shows electrochemical curves for the battery thus obtained at 120° C. and for various regimes. In this figure, the potential V is a function of the amount of lithium inserted per mole of active material (light gray line: cycles for C/32; black line: cycles for C/20).

Example 6

Production of an "all-Solid-State" Li-Ion Battery According to the Process of the Invention In this example, an 8 mm-diameter battery was produced in which the positive/negative electrode mass ratio was 1 for electrode compositions containing 25 wt % active electrode material, 60 wt % electrolyte and 15 wt % electron-conductivity producing agent.

This battery consisted of:
a positive electrode composed of 0.05 g of $LiCoPO_4$ (LCP) having an average particle size of 1 μm, of 0.12 g of $Li_{1.5}Al_{0.5}Ge_{1.5}(PO_4)_3$ (LAG) having an average particle size of 5-10 μm and of 0.03 g of carbon black, sold under the trade name Super P® by Timcal, having an average particle size of 50-100 nm. The mixture of these ingredients was manually ground in an agate mortar for 20 minutes;
a negative electrode composed of 0.05 g of $Li_3V(PO_4)_3$ (INP) having an average particle size of 30-40 μm, of 0.12 g of LAG having an average particle size of 5-10 μm and of 0.03 g of Super P® carbon, sold by Timcal, having an average particle size of 50-100 nm. The mixture of these ingredients was manually ground in an agate mortar for 20 minutes; and of a solid electrolyte composed of 0.1 g of $Li_{1.5}Al_{0.5}Ge_{1.5}(PO_4)_3$ having a particle size ranging from 0.4 to 5 μm.

The various mixtures making up the positive electrode, the electrolyte and the negative electrode were then placed in succession in an 8 mm-diameter graphite die (grade 2333, Carbone Lorraine) the interior of which was protected with a flexible graphite film sold under the trade name Papyex® by Carbone Lorraine. The die was then closed by symmetrical pistons also made of grade 2333 graphite and introduced into the chamber of an SPS machine sold by Sumitomo Inc. under the trade name Dr Sinter 2080®, and the chamber was then pumped to a secondary vacuum. The battery was then formed by applying two ramps, namely a pressure ramp and a temperature ramp. A pressure of 100 MPa was achieved in three minutes and held for the rest of the synthesis (7 minutes). A temperature of 650° C. was achieved in 2 steps: a ramp at 100° C.min$^{-1}$ for 5 minutes, then a ramp of 50® C.min.$^{-1}$ for 3 minutes. This temperature was then held for 2 minutes. These temperature ramps were obtained by applying pulsed DC currents defined over 14 periods of 3.2 ms, 12 periods of pulses and 2 periods without pulses. The die was then cooled in the chamber of the SPS. The battery thus obtained was then buffed with sandpaper so as to remove the residual Papyex® film.

A monolithic 8 mm-diameter Li-ion battery having a total thickness of 3030 μm was thus obtained, said battery consisting of a layer of a 940 μm-thick positive-electrode composite, a 740 μm-thick intermediate solid-electrolyte layer and a 1350 μm-thick layer of a negative-electrode material.

In this battery, the positive/negative electrode mass ratio was 1 for electrode compositions containing 25 wt % active electrode material, 60 wt % $Li_{1.5}Al_{0.5}Ge_{1.5}(PO_4)_3$ electrolyte and 15 wt % Super P® carbon.

Example 7

Production of an "all-Solid-State" Li-Ion Cell According to the Process of the Invention In this example, an 8 mm-diameter battery stack was produced in which the positive/negative electrode mass ratio was 0.5 for electrode compositions containing 25 wt % active electrode material, 60 wt % electrolyte and 15 wt % electron-conductivity producing agent.

Figure 7:
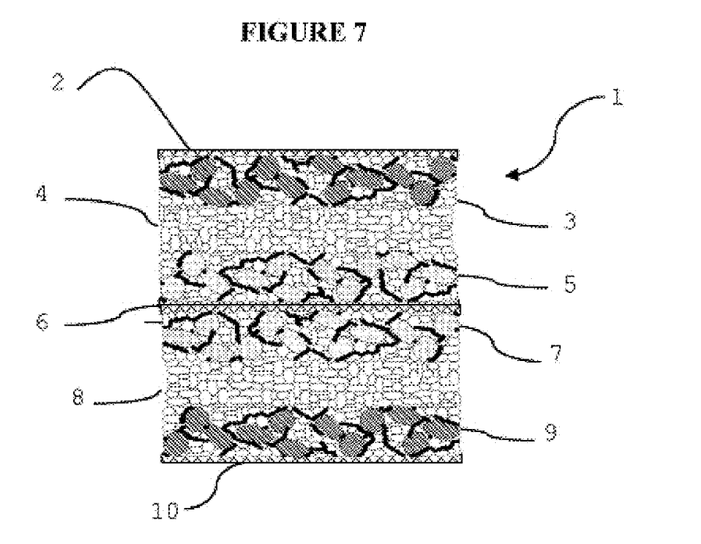
FIG. 7 is a schematic view of a cell of two batteries in Example 7 according to one embodiment.

Appended FIG. 7 shows a schematic view of this cell 1 comprising two batteries connected back to back.

This cell 1 consists, in the order shown in FIG. 7, of:
a 20 μm (copper foil) current collector 2;
a first negative electrode 3 composed of 0.0125 g of LVP having an average particle size of 30-40 μm, of 0.03 g of LAG having an average particle size of 5-10 μm and of 0.0075 g of Super P® carbon, sold by Timcal, having an to average particle size of 50-100 nm. The mixture of these ingredients was manually ground in an agate mortar for 20 minutes; and
of a solid electrolyte 4 composed of 0.03 g of LAG having an average particle size ranging from 5-10 μm.
a first positive electrode 5 composed of 0.00625 g of LFP having an is average particle size of 15-20 μm, of 0.015 g of LAG having an average particle size of 5-10 μm and of 0.00375 g of carbon black, sold under the trade name Super P® by Timcal, having an average particle size of 50-100 nm. The mixture of these ingredients was manually ground in an agate mortar for 20 minutes;

a 20 µm (stainless-steel foil) current collector 6;

a second positive electrode 7 identical to the first positive electrode 5;

a solid electrolyte 8 composed of 0.03 g of LAG having an average particle size of 5-10 µm;

a second negative electrode 9 identical to the first negative electrode 3; and a 20 µm (copper foil) current collector 10.

The various elements were placed in succession in an 8 mm-diameter graphite die (grade 2333, Carbone Lorraine) the interior of which was protected with a Papyex® film. The die was then closed by symmetrical pistons also made of grade 2333 graphite and introduced into the chamber of an SPS machine used above in example 1, and the chamber was then pumped to a secondary vacuum. The battery was then formed under the conditions described above in example 1.

An 8 mm-diameter bipolar cell having a total thickness of 1520 µm was obtained, said cell consisting of layers of a 170 µm-thick positive-electrode composite, 200 µm-thick intermediate solid-electrolyte layers and 370 µm-thick layers of a negative-electrode composite.

Example 8

Production of a Stack of 2 "all-Solid-State" Li-Ion Batteries According to the Process of the Invention In this example, an 8 mm-diameter battery was produced in which the positive/negative electrode mass ratio was 0.5 for electrode compositions containing 25 wt % active electrode material, 60 wt % electrolyte and 15 wt % electron-conductivity producing agent.

Figure 8:
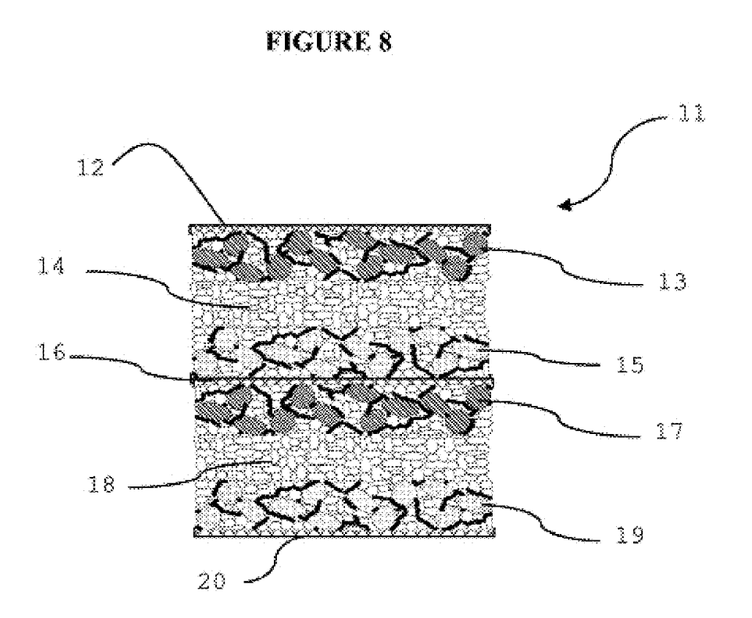
FIG. 8 is a schematic view of a bipolar cell in Example 8 according to one embodiment.

Appended FIG. 8 shows a schematic view of a bipolar cell 11 comprising two batteries connected in series.

This series stack (FIG. 8) consists of:

a 20 µm (copper foil) current collector 12;

a first negative electrode 13 composed of 0.0125 g of DIP having an average particle size of 30-40 µm, of 0.03 g of LAG having an average particle size of 5-10 µm and of 0.0075 g of Super P carbon, sold by Timcal, having an average particle size of 50-100 nm. The mixture of these ingredients was manually ground in an agate mortar for 20 minutes; and of a solid electrolyte 14 composed of 0.03 g of LAG having an average particle size ranging from 5-10 µm.

a first positive electrode 15 composed of 0.00625 g of LFP having an average particle size of 15-20 µm, of 0.015 g of LAG having an average particle size of 5-10 µm and of 0.00375 g of carbon black, sold under the trade name Super P® by Timcal, having an average particle size of 50-100 nm. The mixture of these ingredients was manually ground in an agate mortar for 20 minutes;

a 20 µm (stainless-steel foil) current collector 16;

a second negative electrode 17 identical to the first negative electrode 13;

a solid electrolyte 19 composed of 0.03 g of LAG having an average particle size of 5-10 µm;

a second positive electrode 19 identical to the first positive electrode 15; and a 20 µm (stainless-steel foil) current collector 20.

The various elements were placed in succession in an 8 mm-diameter graphite die (grade 2333, Carbone Lorraine) the interior of which was protected with a Papyex® film. The die was then closed by symmetrical pistons also made of grade 2333 graphite and introduced into the chamber of an SPS machine used above in example 1, and the chamber was then pumped to a secondary vacuum. The battery was then formed under the conditions described above in example 1.

An 8 mm-diameter stack of two batteries in series having a total thickness of 1550 µm was obtained, said cell consisting of layers of a 170 µm-thick positive-electrode composite, 200 µm-thick intermediate solid-electrolyte layers and 370 µm-thick layers of a negative-electrode composite.

The invention claimed is:

1. A process for producing a bulk all-solid-state Li-ion battery with a monolithic body having at least one negative-electrode composite layer and at least one positive-electrode composite layer, said layers being separated from one another by at least one intermediate solid-electrolyte layer, said process comprising the steps of:

preparing a pulverulent mixture (MP1) comprising at least one powder of an active negative-electrode material, at least one powder of a solid electrolyte, and at least one powder of electron-conductivity providing agent; and preparing a pulverulent mixture (MP2) comprising at least one powder of an active lithium-based positive-electrode material, at least one powder of a solid electrolyte, and at least one powder of electron-conductivity providing agent, wherein:

the battery is formed in a single step by superposing at least one layer of said pulverulent mixture MP1 and at least one layer of said pulverulent mixture MP2, said layers being separated from one another by at least one intermediate layer of a solid electrolyte in pulverulent form, and simultaneously sintering these sets of three layers in pulverulent form, at a pressure of at least 20 MPa, using a pulsed current;

the particle size of the solid electrolyte in pulverulent form is 5 µm or less;

the solid-electrolyte content in each of the pulverulent mixtures MP1 and MP2 independently varies from 35 to 80 wt %;

the content of the electron-conductivity providing agent in each of the pulverulent mixtures MP1 and MP2 independently varies from 2 to 25 wt %; and the active electrode material content in each of the pulverulent mixtures MP1 and MP2 independently varies from 20 to 85 wt %.

2. The process as claimed in claim 1, wherein the particle size of the solid-electrolyte powders that can be used in the mixtures MP1 and MP2 and in the intermediate electrolyte layer is smaller than the particle size of the other pulverulent components present in the mixtures MP1 and MP2.

3. The process as claimed in claim 1, wherein the particle size the solid-electrolyte powders is 1 µm or less.

4. The process as claimed in claim 1, wherein the average particle size of the mixtures MP1 and MP2 independently varies from 1 to 10 µm.

5. The process as claimed in claim 1, wherein the particle size of the mixture MP1 is substantially identical to the particle size of the mixture MP2.

6. The process as claimed in claim 1, wherein the active negative-electrode material is chosen from lithium phosphates, titanium/lithium oxides, niobium phosphates, silicon and graphite.

7. The process as claimed in claim 6, wherein the active negative-electrode material is a lithium phosphate chosen from $Li_3V_2(PO_4)_3$, $LiTi_2(PO_4)_3$, or one of their mixtures.

8. The process as claimed in claim 1, wherein the solid electrolytes are chosen from lithium phosphates having the general formula $Li_{1+x}Al_xM_{2-x}(PO_4)_3$ where M=Ge, Ti, Zr, Hf and $0<x<1$.

9. The process as claimed in claim 8, wherein the lithium phosphates are chosen from $Li_{1.5}Al_{0.5}Ge_{1.5}(PO_4)_3$ and $Li_{1.3}Al_{0.3}Ti_{1.7}(PO_4)_3$.

10. The process as claimed in claim 1, wherein the three layers contain the same electrolyte.

11. The process as claimed in claim 1, wherein the solid electrolyte present in the mixture MP1 is different to the solid electrolyte present in the mixture MP2, and in that the layer of mixture MP1 contains at least one solid electrolyte E1, the layer of mixture MP2 contains at least one solid electrolyte E2 that is different from E1, and the electrolyte layer separating the layers of the mixtures MP1 and MP2 consists of at least one layer of electrolyte E1 making contact with the layer of mixture MP1, and at least one layer of electrolyte E2 making contact with the layer of mixture MP2.

12. The process as claimed in claim 1, wherein the active positive-electrode material is selected from the group consisting of lithium phosphates and lithium oxides.

13. The process as claimed in claim 12, wherein the lithium phosphates that can be used by way of active positive-electrode material are selected from the group consisting of $LiFePO_4$, $Li_3V_2(PO_4)_3$, $LiCoPO_4$, $LiMnPO_4$, $LiNiPO_4$ and their mixtures.

14. The process as claimed in claim 1, wherein the active negative-electrode material, the one or more solid electrolytes, and the active positive-electrode material are chosen from lithium phosphates.

15. The process as claimed in claim 1, wherein the electron-conductivity providing agent is chosen from carbon-based materials, metals and nitrides.

16. The process as claimed in claim 1, wherein the electron-conductivity providing agent is a carbon-based material in the form of particles with nanoscale particle size.

17. The process as claimed in claim 1, wherein the sintering is carried out under a primary or secondary vacuum in an argon or nitrogen atmosphere.

18. The process as claimed in claim 1, wherein the sintering is carried out at a pressure from 20 to 200 MPa.

19. The process as claimed in claim 1, wherein the maximum sintering temperature varies from 500 to 1000° C.

20. The process as claimed in claim 1, wherein the sintering is carried out under a secondary vacuum at a pressure of about 100 MPa, at a maximum temperature lying between 600 and 700° C., maintained for a time of 2 to 4 minutes.

21. The process as claimed in claim 1, wherein the amplitude of the pulsed current varies from 10 to 8000 A and in that the length of each pulse varies from 1 to 5 ms.

22. The process as claimed in claim 1, wherein, during the step of forming the battery, at least one current collector is positioned on the external face of the layer of mixture MP1 and/or on the external face of the layer of mixture MP2, so as to be simultaneously sintered with the layer of mixture MP1, the electrolyte layer and layer of mixture MP2.

23. The process as claimed in claim 22, wherein said current collector is selected from the group consisting of copper, nickel, stainless steel, aluminum, carbon, titanium, silver, gold, platinum, or one of their alloys.

24. The process as claimed in claim 22, wherein a first current collector is positioned on the layer of mixture MP1 and a second current collector is positioned on the layer of mixture MP2, no as to simultaneously sinter at least five layers: first collector/MP1 layer/solid-electrolyte layer/MP2 layer/second collector.

25. The process as claimed in claim 1, wherein the active positive-electrode is optionally coated with a protective layer selected from the group consisting of $AlPO_4$, $Li_2SiO_3$, $ZrO_2$, $FePO_4$.

26. The process as claimed in claim 6, wherein the active negative-electrode material is coated with a protective layer selected from the group consisting of $AlPO_4$, $Li_2SiO_3$, $ZrO_2$, $FePO_4$.

* * * * *